US009714021B2

(12) United States Patent
West (10) Patent No.: US 9,714,021 B2
(45) Date of Patent: Jul. 25, 2017

(54) SYSTEM AND METHOD FOR COMPENSATION OF TURBO LAG IN HYBRID VEHICLES (71) Applicant: Allison Transmission, Inc., Indianapolis, IN (US)

(72) Inventor: Stephen T. West, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 145 days.

(21) Appl. No.: 14/838,403

(22) Filed: Aug. 28, 2015

(65) Prior Publication Data
US 2015/0367831 A1 Dec. 24, 2015

Related U.S. Application Data (63) Continuation of application No. PCT/US2014/020417, filed on Mar. 4, 2014.

(60) Provisional application No. 61/782,962, filed on Mar. 14, 2013.

(51) Int. Cl.
*B60L 11/00* (2006.01)
*G05D 9/04* (2006.01)
(Continued)

(52) U.S. Cl.
CPC .......... *B60W 20/00* (2013.01); *B60W 10/06* (2013.01); *B60W 10/08* (2013.01); *B60W 20/11* (2016.01);
(Continued)

(58) Field of Classification Search
CPC ...... B60W 20/00; B60W 20/11; B60W 20/19; B60W 50/0097; B60W 10/08;
(Continued)

(56) References Cited

U.S. PATENT DOCUMENTS 4,901,530 A 2/1990 Kawamura
5,881,559 A 3/1999 Kawamura
(Continued)

FOREIGN PATENT DOCUMENTS

CN 102267296 11/2011
CN 102869905 1/2013
(Continued)

OTHER PUBLICATIONS

International Search Report and Written Opinion issued in PCT/US2014/020417, dated Jun. 9, 2014, 15 pgs.

*Primary Examiner* — Mary Cheung
(74) *Attorney, Agent, or Firm* — Woodard, Emhardt, Moriarty, McNett & Henry LLP (57) ABSTRACT A system and method for compensation of turbo lag in hybrid vehicles is disclosed. The system identifies a zero boost power limit of the engine and a torque curve power limit. A turbocharger dynamic model is then developed based on measurements of the input engine power and the output max available engine power. The model is used to determine an overall propulsion power limit based on the combination of the engine and motor in operation. A power request by the driver may then be limited to the overall propulsion power limit to compensate for the effect of the turbocharger when propelling the vehicle using both the engine and motor and better simulate the engine-only response.

42 Claims, 3 Drawing Sheets (51) Int. Cl.
*B60W 20/00* (2016.01)
*B60W 10/06* (2006.01)
*B60W 10/08* (2006.01)
*B60W 50/00* (2006.01)
*B60W 20/11* (2016.01)
*B60W 20/19* (2016.01)
*F02D 41/10* (2006.01)
*F02D 41/14* (2006.01)
B60K 6/24 (2007.10)
B60K 6/48 (2007.10)
F02B 37/00 (2006.01)
F02D 41/00 (2006.01)

(52) U.S. Cl.
CPC ........ *B60W 20/19* (2016.01); *B60W 50/0097* (2013.01); *F02D 41/10* (2013.01); *F02D 41/1497* (2013.01); B60K 6/24 (2013.01); B60K 6/48 (2013.01); B60W 2050/0039 (2013.01); B60W 2050/0088 (2013.01); F02B 37/00 (2013.01); F02D 41/0007 (2013.01); F02D 2200/101 (2013.01); F02D 2200/1004 (2013.01); Y02T 10/6286 (2013.01); Y02T 10/6295 (2013.01); Y10S 903/93 (2013.01)

(58) Field of Classification Search
CPC ......... B60W 10/06; B60W 2050/0088; B60W 2050/0039; F02D 41/10; F02D 41/1497; F02D 2200/1004; F02D 2200/101; F02D 41/0007; B60K 6/48; Y10S 903/93; Y02T 10/6286; Y02T 10/6295
See application file for complete search history.

(56) References Cited

U.S. PATENT DOCUMENTS

| | | | |
|---|---|---|---|
| 6,441,588 B1 | 8/2002 | Yagi et al. |
| 6,469,403 B2 | 10/2002 | Omata et al. |
| 6,518,732 B2 | 2/2003 | Palanisamy |
| 6,686,724 B2 | 2/2004 | Coates et al. |
| 6,727,676 B2 | 4/2004 | Ochiai |
| 6,904,342 B1 | 6/2005 | Hanada et al. |
| 7,009,401 B2 | 3/2006 | Kinoshita et al. |
| 7,015,676 B2 | 3/2006 | Kohama et al. |
| 7,017,348 B2 | 3/2006 | Tajima et al. |
| 7,021,409 B2 | 4/2006 | Tamor |
| 7,078,877 B2 | 7/2006 | Salasoo et al. |
| 7,131,708 B2 | 11/2006 | Tao et al. |
| 7,295,902 B2 | 11/2007 | Chen et al. |
| 7,305,873 B2 | 12/2007 | Hubbard et al. |
| 7,314,043 B1 | 1/2008 | Berger et al. |
| 7,407,026 B2 | 8/2008 | Tamor |
| 7,449,891 B2 | 11/2008 | Cawthorne |
| 7,479,761 B2 | 1/2009 | Okumura |
| 7,482,767 B2 | 1/2009 | Tether |
| 7,486,036 B2 | 2/2009 | Oyobe et al. |
| 7,521,935 B2 | 4/2009 | Uchida |
| 7,538,520 B2 | 5/2009 | Zettel et al. |
| 7,550,946 B2 | 6/2009 | Zettel et al. |
| 7,639,018 B2 | 12/2009 | Zettel et al. |
| 7,640,744 B2 | 1/2010 | Rollinger et al. |
| 7,645,209 B2 | 1/2010 | Dreibholz et al. |
| 7,657,350 B2 | 2/2010 | Moran |
| 7,661,370 B2 | 2/2010 | Pike et al. |
| 7,677,341 B2 | 3/2010 | Tomo |
| 7,719,238 B2 | 5/2010 | Iida et al. |
| 7,730,984 B2 | 6/2010 | Heap et al. |
| 7,768,235 B2 | 8/2010 | Tae et al. |
| 7,770,676 B2 | 8/2010 | Tenbrock et al. |
| 7,770,678 B2 | 8/2010 | Nozaki et al. |
| 7,784,575 B2 | 8/2010 | Yamanaka et al. |
| 7,795,844 B2 | 9/2010 | Ichikawa et al. |
| 7,800,345 B2 | 9/2010 | Yun et al. |
| 7,828,693 B2 | 11/2010 | Soliman et al. |
| 7,836,985 B2 | 11/2010 | Itoh |
| 7,863,789 B2 | 1/2011 | Zepp et al. |
| 7,865,287 B2 | 1/2011 | Huseman |
| 7,877,996 B2 | 2/2011 | Berger et al. |
| 7,878,282 B2 | 2/2011 | Kumazaki et al. |
| 7,893,637 B2 | 2/2011 | Suhama et al. |
| 7,908,064 B2 | 3/2011 | Cawthorne et al. |
| 7,923,950 B2 | 4/2011 | Takahashi |
| 7,928,699 B2 | 4/2011 | Kohn |
| 7,935,015 B2 | 5/2011 | Tabata et al. |
| 7,967,091 B2 | 6/2011 | Yamazaki et al. |
| 7,977,896 B2 | 7/2011 | Heap et al. |
| 7,987,934 B2 | 8/2011 | Huseman |
| 7,998,023 B2 | 8/2011 | Holmes et al. |
| 8,000,866 B2 | 8/2011 | Heap et al. |
| 8,002,667 B2 | 8/2011 | Hsieh et al. |
| 8,010,247 B2 | 8/2011 | Heap et al. |
| 8,020,652 B2 | 9/2011 | Bryan et al. |
| 8,022,674 B2 | 9/2011 | Miura |
| 8,029,408 B2 | 10/2011 | Seel |
| 8,030,883 B2 | 10/2011 | Katayama |
| 8,035,324 B2 | 10/2011 | Heap |
| 8,035,349 B2 | 10/2011 | Lubawy |
| 8,047,959 B2 | 11/2011 | Fuechtner et al. |
| 8,053,921 B2 | 11/2011 | Ichikawa |
| 8,063,609 B2 | 11/2011 | Salasoo et al. |
| 8,078,417 B2 | 12/2011 | Ishishita |
| 8,082,743 B2 | 12/2011 | Hermann et al. |
| 8,091,667 B2 | 1/2012 | Zettel et al. |
| 8,098,050 B2 | 1/2012 | Takahashi |
| 8,136,615 B2 | 3/2012 | Pels et al. |
| 8,250,864 B2 | 8/2012 | Pott et al. |
| 2003/0160455 A1 | 8/2003 | Hu et al. |
| 2004/0168840 A1 | 9/2004 | Kuang et al. |
| 2004/0235614 A1 | 11/2004 | Tajima et al. |
| 2007/0090803 A1 | 4/2007 | Yun et al. |
| 2007/0125083 A1 | 6/2007 | Rollinger et al. |
| 2008/0087482 A1 | 4/2008 | Ledger et al. |
| 2008/0224478 A1 | 9/2008 | Tamor |
| 2009/0037060 A1 | 2/2009 | Carlhammar et al. |
| 2009/0118929 A1 | 5/2009 | Heap et al. |
| 2009/0118941 A1 | 5/2009 | Heap |
| 2009/0118964 A1 | 5/2009 | Snyder et al. |
| 2009/0118971 A1 | 5/2009 | Heap et al. |
| 2009/0204280 A1 | 8/2009 | Simon, Jr. et al. |
| 2009/0308674 A1 | 12/2009 | Bhattarai et al. |
| 2010/0116235 A1 | 5/2010 | Imamura et al. |
| 2010/0125019 A1 | 5/2010 | Tabata et al. |
| 2010/0250037 A1 | 9/2010 | Yoshida et al. |
| 2010/0262308 A1 | 10/2010 | Anderson et al. |
| 2010/0263952 A1 | 10/2010 | Richter et al. |
| 2010/0299036 A1 | 11/2010 | Vespasien |
| 2010/0312422 A1 | 12/2010 | Imaseki |
| 2011/0040433 A1 | 2/2011 | Steuernagel |
| 2011/0048823 A1 | 3/2011 | Connolly et al. |
| 2011/0130904 A1 | 6/2011 | McGrogan et al. |
| 2011/0301791 A1 | 12/2011 | Swales et al. |
| 2011/0320075 A1 | 12/2011 | Kim et al. |
| 2012/0119509 A1 | 5/2012 | West |
| 2012/0179317 A1* | 7/2012 | Kuberczyk ........... B60W 10/06 701/22 |
| 2012/0208672 A1* | 8/2012 | Sujan ................ B60W 10/02 477/5 |
| 2012/0329603 A1 | 12/2012 | Yamazaki et al. |

FOREIGN PATENT DOCUMENTS

| | | |
|---|---|---|
| DE | 10 2008 001128 A1 | 10/2009 |
| DE | 10 2008 054802 A1 | 6/2010 |
| JP | 2000-175305 A1 | 6/2000 |
| WO | 2008/034661 A1 | 3/2008 |
| WO | 2010/079275 A1 | 7/2010 |
| WO | 2011/134704 A1 | 11/2011 |

* cited by examiner

SYSTEM AND METHOD FOR COMPENSATION OF TURBO LAG IN HYBRID VEHICLES

CROSS REFERENCE TO RELATED APPLICATIONS

This application is a continuation of International Application No. PCT/US2014/020417 filed Mar. 4, 2014, which claims the benefit of U.S. Provisional Application No. 61/782,962 filed Mar. 14, 2013, which are hereby incorporated by reference in their entirety.

BACKGROUND

Hybrid vehicles typically have a combustion engine and an eMachine which can act as both an electric motor and a generator. During braking, such vehicles are capable of capturing and storing the braking energy in a battery for later use in propelling the vehicle. This process is commonly referred to as regenerative braking. Some hybrid vehicles are configured to use the energy stored in the battery to boost propulsion performance beyond the capabilities of the engine acting alone. However, it is generally preferred to instead operate the vehicle in a manner which simulates the propulsion response of the engine only. This assures the operator will experience a response which is consistent with non-hybrid vehicles.

In order to achieve this engine-only simulated response when using both the electric motor and engine to propel the vehicle, many hybrid vehicles reduce the output of the engine by that of the hybrid motor to match the equivalent engine-only output. This method is typically satisfactory for normally aspirated engines, since the torque produced by the engine at a given rotational engine speed (rpm) is relatively constant over time.

In turbocharged engines, however, the power generated by the engine may change with time due to the effect of the turbocharger. A turbocharger uses engine exhaust gases to drive a turbine wheel. A shaft connects the turbine wheel to a compressor wheel in the air intake path of the engine. Therefore, as the turbine wheel is driven by the flow of exhaust gas, the compressor wheel also spins and compresses the air to the intake of the engine. As the intake air is compressed over time (and increasing amounts of fuel are added), the power generated by the engine also increases. As the engine output increases and more exhaust gases are generated, the turbine and compressor wheels spin faster, thereby increasing the power generated by the engine still further. However, because the turbocharger requires time to overcome the inertia of the compressor wheel and begin to spin, there is a delay in the delivered power response. This effect is commonly referred to as turbo lag and gives the operator a feeling of gradual building of engine power.

The turbocharger effect prevents the simple substitution of electrical power for engine power in a hybrid vehicle where an engine-only equivalent response is desired. This is because as electrical power from the motor replaces engine power, the engine power generation capacity is diminished even further due to the loss of the turbo effect. In other words, if a portion of the engine power is substituted by power generated by the electric motor, the resulting combination output will not match that of the equivalent output if the engine had been acting alone.

Thus, there is a need for improvement in this field.

SUMMARY

The system and method described herein addresses the issues mentioned above. In a general sense, the disclosed system monitors the engine output over time to determine a dynamic model of the turbocharger effect. The system then applies the model to determine a propulsion power limit for the combined output of the engine and electric motor which will simulate the response of the engine acting alone.

According to one aspect of the disclosure, a method of operating a hybrid vehicle is disclosed, comprising using a vehicle controller, determining a zero boost power limit of an engine of the hybrid vehicle, said engine including a turbocharger, determining a torque curve power limit of the engine, the torque curve power limit based upon the maximum available power when the turbocharger is operating at a predetermined level, monitoring a current power of the engine and a maximum available power of the engine when the maximum available power is between the zero boost power limit and the torque curve power limit, determining a dynamic response model of the engine based on said monitoring, the model providing an estimation of the engine output power over time as the turbocharger increases in speed, receiving a driver output torque request, and operating the hybrid vehicle such that the collective output power of the engine and an eMachine of the hybrid vehicle is automatically limited to a turbo-equivalent power limit based on said model, said-turbo equivalent power limit representing the power limit of the engine acting alone.

According to another aspect, a hybrid system is disclosed, comprising an engine having a turbocharger, an engine controller operatively coupled to the engine, an eMachine, a hybrid controller operatively coupled to the eMachine and in communication with the engine controller. The hybrid controller is configured to determine a zero boost power limit of the engine, receive torque curve information from the engine controller, determine a torque curve power limit of the engine from the torque curve information, monitor a current power of the engine and a maximum available power of the engine when the maximum available power is between the zero boost power limit and the torque curve power limit, determine a dynamic response model of the engine based on the monitoring, the model providing an estimation of the engine output power over time as the turbocharger increases in speed, receive a driver output torque request from the engine controller, and operate the hybrid vehicle such that the collective output power of the engine and an eMachine of the hybrid vehicle is automatically limited to a turbo-equivalent power limit based on the model, the turbo-equivalent power limit representing the power limit of the engine acting alone.

Further forms, objects, features, aspects, benefits, advantages, and embodiments of the present invention will become apparent from a detailed description and drawings provided herewith.

DETAILED DESCRIPTION

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 1:
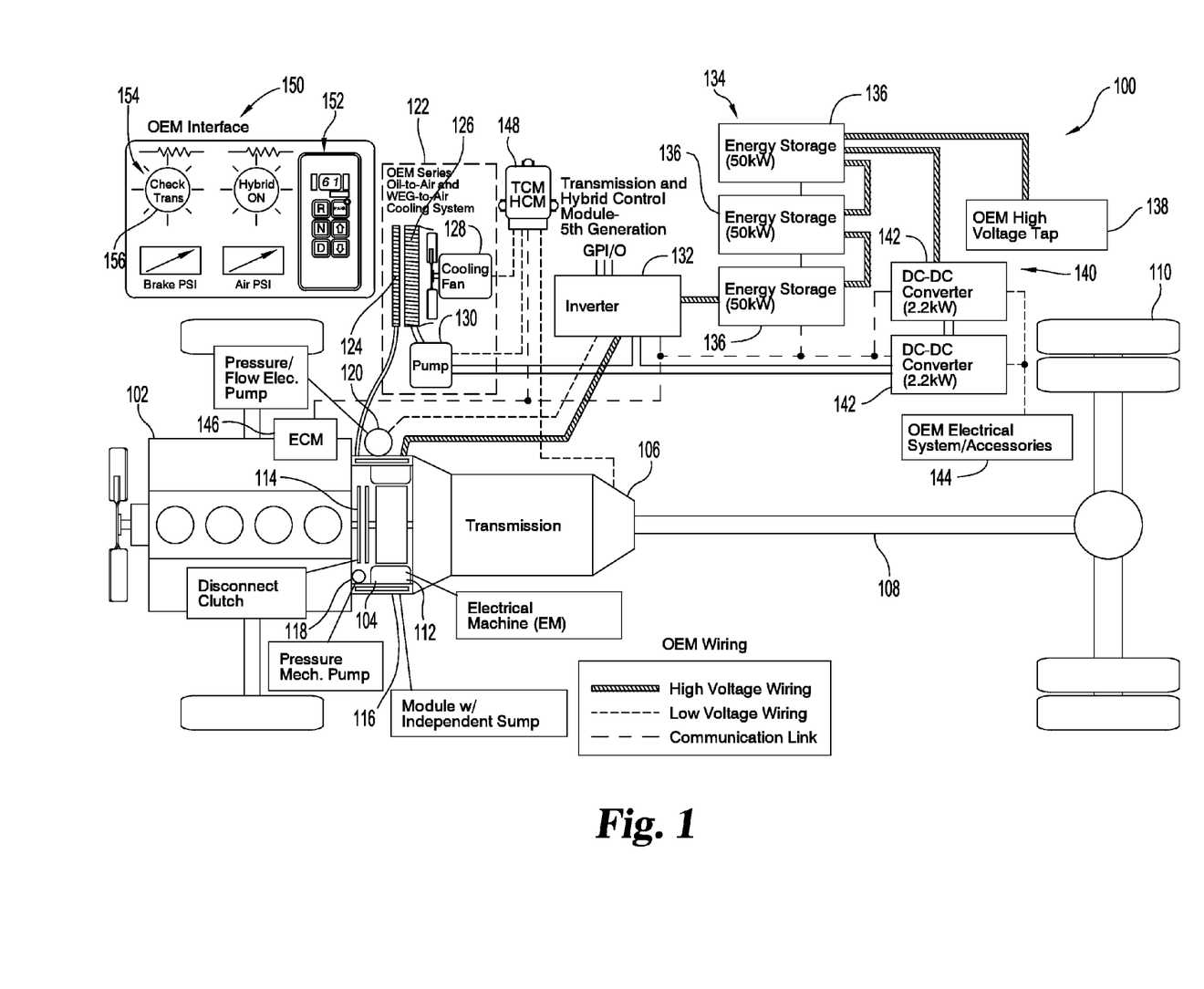
FIG. 1 illustrates a diagrammatic view of one example of a hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. In one example, the engine 102 comprises an internal combustion engine having a turbocharger. The turbocharger includes a turbine wheel in the exhaust path of the engine. A shaft connects the turbine wheel to a compressor wheel in the air intake path of the engine. As the turbine wheel is driven by the flow of exhaust gas from the engine, the compressor wheel also spins and compresses the air to the intake of the engine, thereby increasing the power generating capacity of the engine. The hybrid module 104 incorporates a rotating electrical machine, commonly referred to as an eMachine 112, and a clutch 114 that operatively connects and disconnects the engine 102 from the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids. To circulate the fluid, the hybrid module 104 includes a mechanical pump 118 and an electrical (or electric) pump 120. With this combination of both the mechanical pump 118 and electrical pump 120, the overall size and, moreover, the overall expense for the pumps is reduced.

The hybrid system 100 further includes a cooling system 122 that is used to cool the fluid supplied to the hybrid module 104 as well as the water-ethylene-glycol (WEG) to various other components of the hybrid system 100 which will be described later in further detail. Looking at FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. A cooling fan 128 flows air through both fluid radiator 124 and main radiator 126. A circulating or coolant pump 130 circulates the antifreeze to the main radiator 126.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are connected together, preferably in parallel, to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1. In a typical embodiment, the transmission/hybrid control module 148 and engine control module 146 each comprise a computer having a processor, memory, and input/output connections. Additionally, the inverter 132, energy storage system 134, DC-DC converter system 140, and other vehicle subsystems may also contain computers having similar processors, memory, and input/output connections.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

Figure 2:
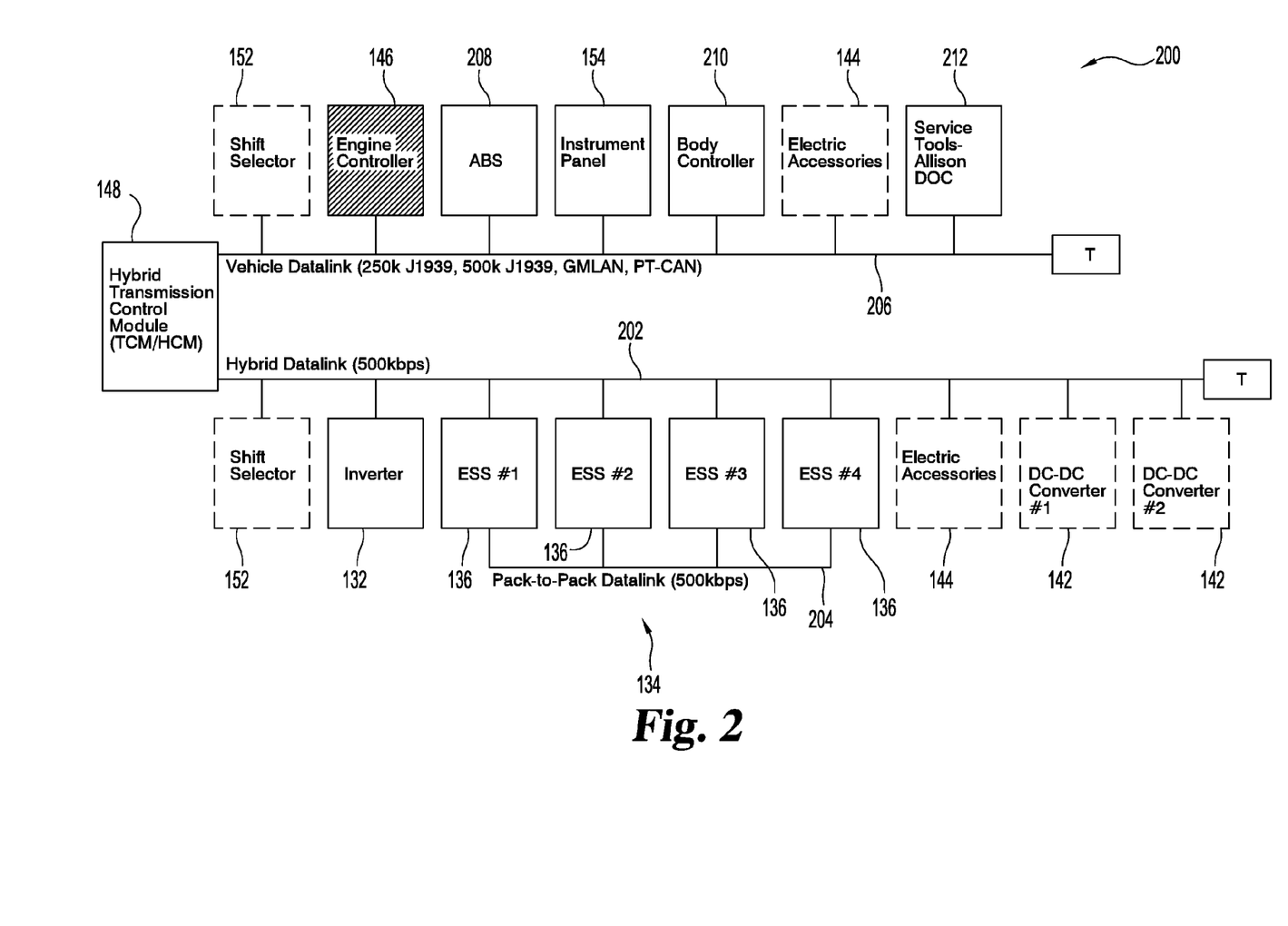
FIG. 2 illustrates a general diagram of an electrical communication system in the FIG. 1 hybrid system.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the shift selector 152, inverter 132, the energy storage system 134, the low voltage systems/accessories 144, and the DC-DC converter modules 142. Within the energy storage system 134, an energy storage module data link 204 facilitates communication between the various energy storage modules 136. However, it is contemplated that in other embodiments the various energy storage system modules 136 can communicate with one another over the hybrid data link 202. With the hybrid data link 202 and the energy storage module data link 204 being separate from the data links used in the rest of the vehicle, the control/electrical component of the hybrid system 100 can be readily tied into the vehicle with minimum impact. In the illustrated example, the hybrid data link 202 and the energy storage module data link 204 each have a 500 kilobit/second (kbps) transmission rate, but it is envisioned that data can be transferred at other rates in other examples. Other components of the vehicle communicate with the transmission/hybrid control module 148 via a vehicle data link 206. In particular, the shift selector 152, the engine control module 146, the instrument panel 154, an antilock braking system 208, a body controller 210, the low voltage systems/accessories 144, and service tools 212 are connected to the vehicle data link 206. For instance, the vehicle data link 206 can be a 250 k J1939-type data link, a 500 k J1939-type data link, a General Motors LAN, or a PT-CAN type data link, just to name a few examples. All of these types of data links can take any number of forms such as metallic wiring, optical fibers, radio frequency, and/or a combination thereof, just to name a few examples.

In terms of general functionality, the transmission/hybrid control module 148 receives power limits, capacity, available current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132. The transmission/hybrid control module 148 also receives information about the operation of the electrical pump 120 as well as issues commands to the electrical pump 120. From the inverter 132, the transmission/hybrid control module 148 receives a number of inputs such as the motor/generator torque that is available, the torque limits, the inverter's voltage, current and actual torque speed. Based on that information, the transmission/hybrid control module 148 controls the torque speed and the pump 130 of the cooling system. From the inverter 132, the transmission/hybrid control module 148 also receives a high voltage bus power and consumption information. The transmission/hybrid control module 148 also monitors the input voltage and current as well as the output voltage and current along with the operating status of the individual DC-DC converter modules 142 of the DC-DC converter system 140. The transmission/hybrid control module 148 also communicates with and receives information regarding engine speed, engine torque, engine power, engine power limit, torque curve information, and driver requested output torque, to name a few, from the engine control module 146 and in response controls the torque and speed of the engine 102 via the engine control module 146.

As discussed above, it may be advantageous to simulate an engine-only response during operation, even when operating the vehicle with the assistance of the eMachine 112. In order to better represent such a response, a method for compensating for the turbo-lag effect (e.g., when engine 102 is implemented as a turbocharged engine) will now be discussed.

Figure 3:
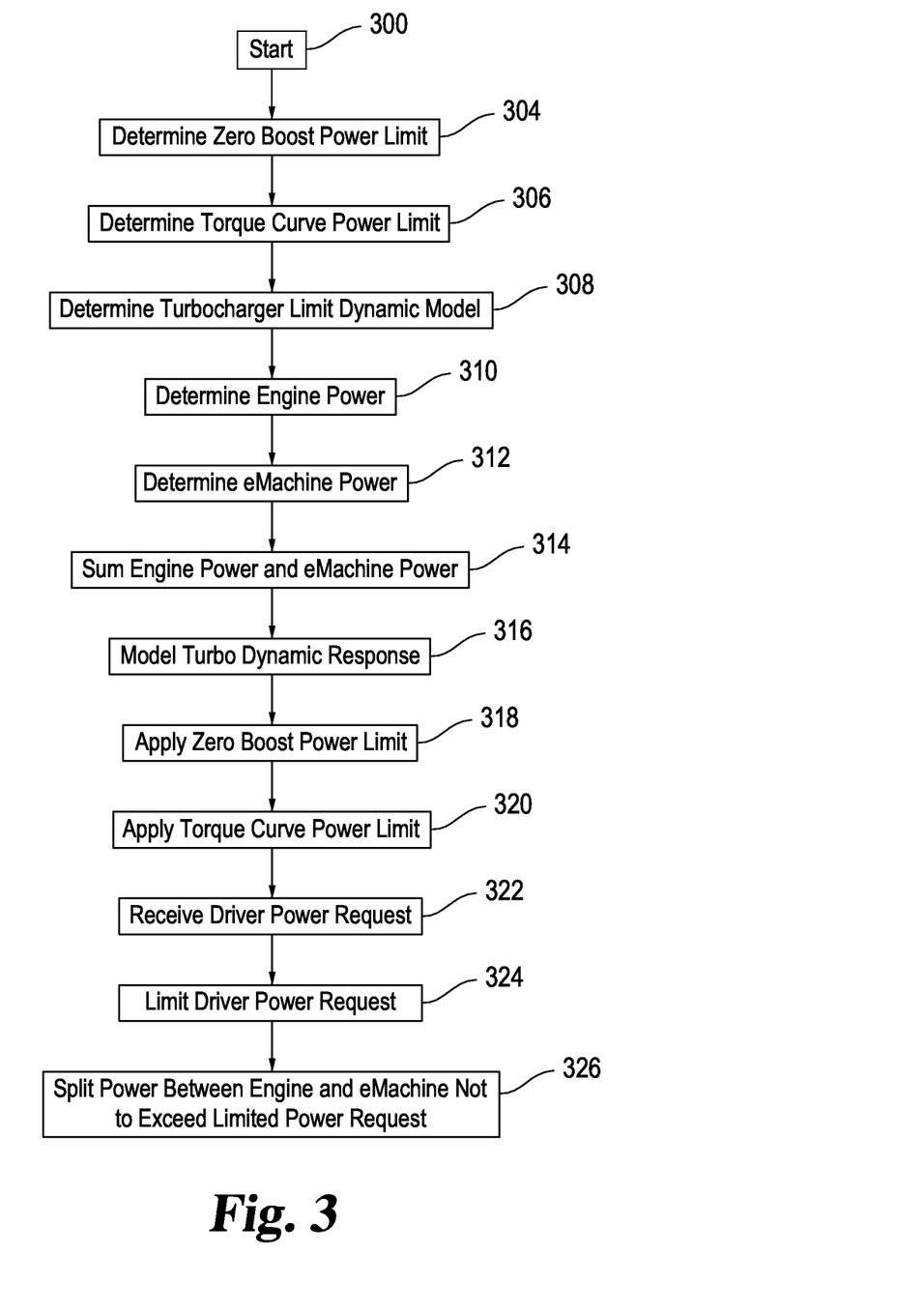
FIG. 3 illustrates a method for operating the hybrid system of FIG. 1 according to one embodiment.

The response of a turbocharged engine may be modeled as a first order linear system described by the differential equation (1) below:

$$\frac{dy(t)}{dt} = -\frac{y(t)}{T} + ku(t) \quad (1)$$

where u(t) is the input engine power, y(t) is the resulting output power due to the turbocharger, T is a time constant, and k is a gain constant. It shall be understood that equation (1) represents only one possible turbo response model and that any model of turbocharger dynamics known in the art may be used in block 304. Furthermore, the first order linear system of equation (1) can be expressed in discrete time as equation (2) below:

$$y([n+1]T_S) = \alpha y(nT_S) + k(1-\alpha)u(nT_S) \quad (2)$$

where $$\alpha = e^{-\frac{T_S}{T}}$$

and $T_s$ is the discrete sample time, and n is the current iteration. Therefore, $y([n+1])T_s$) is the output value of the n+1 iteration, $y(nT_s)$ is the output value of the n iteration, and $u(nT_s)$ is the input value of the n iteration.

The engine control module 146 is continuously broadcasting the current power, power limit, torque curve, and the driver requested output torque to the transmission/hybrid control module 148. The engine control module 146 determines these values based on data received from various sensors within the system 100 and other stored data. For example, the current engine power may be determined by the actual engine torque (based on known fueling rate to torque relationships for the engine) multiplied by the current engine shaft speed received from a speed sensor on the engine output shaft. The engine power limit is the current power that the engine could supply if requested. The torque curve is a data table which equates various engine speeds to the amount of torque that could be supplied by the engine at those speeds if the turbo was already spun up to a given speed. The driver requested output torque is determined by the engine control module 146 based on the position of an accelerator pedal or other driver input device. It shall be understood that the values being received and calculated by the engine control module 146 may also be received and calculated directly by the transmission/hybrid control module 148. The engine control module 146 and the transmission/hybrid contorl module 148 may be implented as separate units or integrated into a single controller or housing.

If the input $u(nT_s)$ of equation (1) is taken to be the current engine power and the output $y(nT_s)$ is taken to be the engine power limit, then as long as the engine is operating between an identified zero boost power limit and the torque curve limit, the constants k and α can be identified. In other words, since the input and output of the equation (1) are being broadcast by the engine and are therefore known, the remaining unknown k and α constants can be determined. The process for determining the k and a constants based on the known input and output may be implemented using adaptive infinite impulse response (IIR) filtering, such as the Steiglitz-McBride algorithm, although other methods known in the art may also be used. The determination of the constants k and α may be run continuously in order to constantly improve the accuracy of the turbo response model over time. To determine the zero boost power limit, the power limit broadcast by the engine control module 146 may be monitored while the engine is operating at low power, such as during an idle condition.

The identified constants k and α can be used to determine an overall turbo-equivalent power limit. The turbo-equivalent power limit is the limit that will be imposed on the combined output power of the engine 102 and eMachine 112 when both the engine 102 and eMachine 112 are contributing to the power being fed to the transmission 106. In this way, response of the vehicle perceived by the vehicle will simulate that of the turbocharged engine acting alone.

FIG. 3 represents a process for implementing the above method using the hybrid system 100. The process begins at start point 302 where the transmission/hybrid control module 148 determines that the engine 102 has attained an idle speed for a predetermined time (304). The transmission/hybrid control module 148 determines the zero boost power limit by averaging the values for maximum available torque received from the engine control module 146 over the idle time period and multiplying the average by the current engine speed. This provides an estimated lower limit for the engine output power when the turbocharger is not contributing to the output.

At stage 306, the transmission/hybrid control module 148 determines the torque curve power limit. As discussed above, the transmission/hybrid control module 148 receives the torque curve data (available torques at various speeds) from the engine control module 146. Alternatively, the torque curve data may be stored in memory of the transmission/hybrid control module 148. To determine the torque curve power limit, the transmission/hybrid control module 148 retrieves the maximum torque available at the current engine speed from the torque curve data, and multiplies the result by the current engine speed.

Continuing to stage, 308, the transmission/hybrid control module 148 monitors the values for current engine power, and current maximum available engine power being broadcast by the engine control module 146. As discussed above, at times when the current maximum available engine power is between the zero boost power limit (from stage 304) and the torque curve power limit (from stage 306), the observed data is used to determine the constants k and α of the turbocharger response equation (2). The stages 304, 306, and 308 above may be run continuously and independent of the remaining stages to adaptively identify and update the values being determined.

At stage 310, the transmission/hybrid control module 148 determines the current engine power being output by the engine 102. The transmission/hybrid control module 148 receives the actual engine torque and the current engine speed from the engine control module 146, and multiplies these values to determine the current engine power.

At stage 312, the transmission/hybrid control module 148 determines the current eMachine 112 output power being delivered to the transmission 106. To determine this, the transmission/hybrid control module 148 multiplies the eMachine 112 motor torque (which is known by the transmission/hybrid control module 148) by the eMachine 112 speed (received from a speed sensor on a shaft of the eMachine 112).

At stage 314, the transmission/hybrid control module 148 determines a total propulsion power being delivered to the transmission 106 by adding the current engine power from stage 310 to the current eMachine 112 power from stage 312.

At stage 316, along with the known constants k and α, the total propulsion power is applied as input $u(nT_s)$ to equation (2). This gives the resulting turbo equivalent power limit, $y([n+1]T_s)$, for the propulsion power of the combination of engine 102 and eMachine 112.

At stage 318, the transmission/hybrid control module 148 compares the turbo-equivalent power limit from stage 314 to the zero boost power limit from stage 304. If the turbo-equivalent power limit is less than the zero boost power limit, then the turbo-equivalent power limit is set to the zero boost power limit. If not, the turbo-equivalent power limit remains unchanged.

At stage 320, the transmission/hybrid control module 148 compares the turbo-equivalent power limit from stage 318 to the torque curve power limit from stage 306. If the torque curve power limit is less than the turbo-equivalent power limit, then the turbo-equivalent power limit is set to the torque curve power limit. If not, the turbo-equivalent power limit remains unchanged. At this point, the turbo-equivalent power limit is characterized as a total propulsion power limit. The stages 310-320 above may also be run continously and independent of the other stages to adaptively identify and update the values being determined, including total propulsion power limit.

At stage 322, the transmission/hybrid control module 148 determines the driver requested output power. In one embodiment, the transmission/hybrid control module 148 receives the driver requested torque (based on acceleration pedal displacement) and current engine speed from the engine control module 146, and multiplies the values to determine the driver requested output power.

At stage 324, the transmission/hybrid control module 148 compares the driver requested power to the total propulsion power limit from stage 320 and determines a transmission input power request value. If the driver requested output power is less than the total propulsion power limit, then the input power request value will be set to a value equal to the driver requested power. However, if the driver request power is more than the total propulsion power limit, then the transmission input power request will be set to a value equal to the total propulsion power limit.

At stage 326, the transmission/hybrid control module 148 determines the amount of power to be supplied by each of the engine 102 and the eMachine 112 in order to collectively provide a total amount of input power to the transmission which is equal to the transmission input power request value from stage 324. Any combination of power levels of the engine 102 and eMachine 112 may be used as long as the total combined power is equal to the transmission input power request. This ensures that the response felt by the driver is limited to that of the turbocharged engine acting alone It shall be understood that the process of the FIG. 3 may be repeated indefinitely to adaptively update the values being received, evaluated and determined. Additionally, it shall be understood that certain steps of the process may be performed or repeated individually, independent of the other steps as discussed above.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method of operating a hybrid vehicle using a hybrid controller, comprising:
   determining a zero boost power limit of an engine of the hybrid vehicle, said engine including a turbocharger;
   determining a torque curve power limit of the engine, said torque curve power limit based upon the maximum available power when the turbocharger is operating;
   monitoring a current power of the engine and a current maximum available power of the engine when the current maximum available power is between the zero boost power limit and the torque curve power limit; and
   determining a dynamic response model of the engine based on said monitoring, said model providing an estimation of the engine output power over time as the turbocharger substantially contributes to the output power of the engine.

2. The method of claim 1, further comprising:
   receiving a driver output torque request; and
   operating the hybrid vehicle such that the collective output power of the engine and an eMachine of the hybrid vehicle is automatically limited to a turbo-equivalent power limit based on said model, said turbo-equivalent power limit representing the power limit of the engine acting alone.

3. The method of claim 2, further comprising:
   determining an actual engine torque of the engine;
   multiplying said actual engine torque by a current engine speed of the engine to determine a current engine power;
   determining an eMachine torque of the eMachine;
   multiplying said eMachine torque by a current eMachine speed of the eMachine to determine a current eMachine output power;
   adding said current engine power and said eMachine power to determine a total propulsion power;
   using the dynamic model to determine the turbo-equivalent power limit; and
   controlling the engine and eMachine power outputs so that the total propulsion power matches the turbo-equivalent power limit.

4. The method of claim 2, further comprising:
   setting the turbo-equivalent power limit to the zero boost power limit if the zero boost power limit is greater than said turbo-equivalent power limit.

5. The method of of claim 2, further comprising:
   setting the turbo-equivalent power limit to the torque curve power limit if the torque curve power limit is less than the turbo-equivalent power limit.

6. The method of of claim 1, wherein said dynamic response model is determined by the controller using infinite impulse response filtering.

7. The method of claim 1, wherein said dynamic response model is represented discreetly by the equation:

$$y([n+1]T_s) = \alpha y(nT_s) + k(1-\alpha)u(nT_s)$$

where T is a constant, k is a constant, $$\alpha = e^{-\frac{T_s}{T}},$$

$T_s$ is a discrete sample time, $y([n+1]T_s)$ is the turbo-equivalent output power of the n +1 iteration, $y(nT_s)$ is the turbo-equivalent output power value of the n interation, and $u(nT_s)$ is the current engine power of the n iteration.

8. The method of claim 7, wherein T and k are adaptively determined by infinite impulse response filtering.

9. The method claim 1, wherein said zero boost power limit is determined by monitoring the maximum available torque of the engine while the engine is idling.

10. The method of claim 9, wherein said zero boost power limit is determined by multiplying a current engine speed by the average of the maximum available torque of the engine when idling.

11. A hybrid system, comprising:
    an engine having a turbocharger;
    an engine controller operatively coupled to the engine;
    an eMachine;
    a hybrid controller operatively coupled to the eMachine and in communication with the engine controller;
    wherein the hybrid controller is configured to:
       determine a zero boost power limit of the engine;
       receive torque curve information from the engine controller;
       determine a torque curve power limit of the engine from said torque curve information;
       monitor a current power of the engine and a current maximum available power of the engine when the current maximum available power is between the zero boost power limit and the torque curve power limit; and
       determine a dynamic response model of the engine based on said monitoring, said model providing an estimation of the engine output power over time as the turbocharger substantially contributes to the output power of the engine.

12. The method of claim 11, wherein the hybrid controller is further configured to:
    receive a driver output torque request from said engine controller; and
    operate the hybrid vehicle such that the collective output power of the engine and an eMachine of the hybrid vehicle is automatically limited to a turbo-equivalent power limit based on said model, said turbo-equivalent power limit representing the power limit of the engine acting alone.

13. The system of claim 12, wherein the hybrid controller is further configured to:
   receive an actual engine torque and a current engine speed from the engine controller;
   multiply said actual engine torque by said current engine speed to determine a current engine power;
   determine an eMachine torque of the eMachine;
   multiply said eMachine torque by a current eMachine speed of the eMachine to determine a current eMachine output power; and
   add said current engine power and said eMachine power to determine a total propulsion power;
   using the dynamic model to determine the turbo-equivalent power limit; and
   controlling the engine and eMachine power outputs so that the total propulsion power matches the turbo-equivalent power limit.

14. The system of claim 12, wherein the hybrid controller is further configured to set the turbo-equivalent power limit to the zero boost power limit if the zero boost power limit is greater than said turbo-equivalent power limit.

15. The system of claim 12, wherein the hybrid controller is further configured to set the turbo-equivalent power limit to the torque curve power limit if the torque curve power limit is less than the turbo-equivalent power limit.

16. The system of claim 12, wherein said dynamic response model is determined by the hybrid controller using infinite impulse response filtering.

17. The system of claim 11, wherein said dynamic response model is
represented discreetly by the equation:

$$y([n+1]T_s) = \alpha y(nT_s) + k(1-\alpha)u(nT_s)$$

where T is a constant, k is a constant, $$\alpha = e^{-\frac{T_s}{T}},$$

$T_s$ is a discrete sample time, $y([n+1]T_s)$ is the turbo-equivalent output power of the n+1 iternation, $y(nT_s)$ is the turbo-equivalent output power value of the n iteration, and $u(nT_s)$ is the current engine power of the n iteration.

18. The system of claim 17, wherein T and k are adaptively determined by the hybrid controller using infinite impulse response filtering.

19. The system of claim 11, wherein said zero boost power limit is determined by the hybrid controller by monitoring the maximum available torque of the engine while the engine is idling, said maximum available torque received by the hybrid controller from the engine controller.

20. The system of claim 19, wherein said zero boost power limit is determined by multiplying a current engine speed received from the controller by the average of the maximum available torque of the engine when idling.

21. A hybrid system, comprising:
   an engine having a turbocharger;
   an engine controller operatively coupled to the engine;
   an eMachine;
   a hybrid controller operatively coupled to the eMachine and in communication with the engine controller;

wherein the hybrid controller is configured to:
   receive a driver output torque request from said engine controller;
   determine a zero boost power limit of the engine;
   determine a torque curve power limit of the engine from torque curve information received from the engine controller;
   monitor a current power of the engine and a current maximum available power of the engine when the current maximum available power is between the zero boost power limit and the torque curve power limit; and
   determine a dynamic response model of the engine based on said monitoring, said model providing an estimation of the engine output power over time as the turbocharger substantially contributes to the output power of the engine; and
   operate the hybrid vehicle such that the collective output power of the engine and an eMachine of the hybrid vehicle is automatically limited to a turbo-equivalent power limit corresponding to said driver output torque request, said turbo-equivalent power limit determined using the dynamic response model and representing the power limit of the engine acting alone.

22. The hybrid system of claim 21, wherein the hybrid controller and the engine controller comprise a single controller.

23. The hybrid system of claim 21, wherein the hybrid controller and the engine controller are contained in a common housing.

24. The system of claim 21, wherein the hybrid controller is further configured to:
   receive an actual engine torque and a current engine speed from the engine controller;
   multiply said actual engine torque by said current engine speed to determine a current engine power;
   determine an eMachine torque of the eMachine;
   multiply said eMachine torque by a current eMachine speed of the eMachine to determine a current eMachine output power;
   add said current engine power and said eMachine power to determine a total propulsion power;
   using the dynamic model to determine the turbo-equivalent power limit; and
   controlling the engine and eMachine power outputs so that the total propulsion power matches the turbo-equivalent power limit.

25. The system of claim 21, wherein said dynamic response model
is represented discreetly by the equation:

$$y([n+1]T_s) = \alpha y(nT_s) + k(1-\alpha)u(nT_s)$$

where T is a constant, k is a constant, $$\alpha = e^{-\frac{T_s}{T}},$$

$T_s$ is a discrete sample time, $y([n+1]T_s)$ is the turbo-equivalent output power value of the n+1 iternation, $y(nT_s)$ is the turbo-equivalent output power value of the n iteration, and $u(nT_s)$ is the current engine power of the n iteration.

26. The system of of claim 25, wherein the dynamic response model is determined using infinite impulse response filtering.

27. The system of claim 26, wherein T and k are adaptively determined by the hybrid controller using infinite impulse response filtering.

28. The system of claim 21, wherein said zero boost power limit is determined by the hybrid controller by monitoring the maximum available torque of the engine while the engine is idling, said maximum available torque received by the hybrid controller from the engine controller.

29. The system of claim 28, wherein said zero boost power limit is determined by multiplying a current engine speed received from the controller by the average of the maximum available torque of the engine when idling.

30. The system of claim 21, wherein the hybrid controller is further configured to set the turbo-equivalent power limit to a zero boost power limit if the zero boost power limit is greater than said turbo-equivalent power limit.

31. The system of claim 21, wherein the hybrid controller is further configured to set the turbo-equivalent power limit to a torque curve power limit of the engine if the torque curve power limit is less than the turbo-equivalent power limit.

32. A method of operating a hybrid vehicle using a hybrid controller, comprising:
receiving a driver output torque request using the hybrid controller;
determining a zero boost power limit of an engine of the hybrid vehicle, said engine including a turbocharger;
determining a torque curve power limit of the engine, said torque curve power limit based upon the maximum available power when the turbocharger is operating at a predetermined level;
monitoring a current power of the engine and a maximum available power of the engine when the maximum available power is between the zero boost power limit and the torque curve power limit;
determining a dynamic response model of the engine based on said monitoring, said model providing an estimation of the engine output power over time as the turbocharger substantially contributes to the output power of the engine;
using said model to determine said turbo-equivalent power limit; and
using the hybrid controller, operating the hybrid vehicle such that the collective output power of an engine and an eMachine of the hybrid vehicle is automatically limited to said turbo-equivalent power limit corresponding to said driver output torque request, said turbo-equivalent power limit representing the power limit of the engine acting alone.

33. The method of claim 32, further comprising:
receiving an actual engine torque and a current engine speed using the hybrid controller;
multiplying said actual engine torque by said current engine speed to determine a current engine power;
determining an eMachine torque of the eMachine;
multiplying said eMachine torque by a current eMachine speed of the eMachine to determine a current eMachine output power;
adding said current engine power and said eMachine power to determine a total propulsion power;
using the dynamic model to determine the turbo-equivalent power limit; and
controlling the engine and eMachine power outputs so that the total propulsion power matches the turbo-equivalent power limit.

34. The method of claim 33, wherein said dynamic response model is represented discreetly by the equation:

$$y([n+1]T_s) = \alpha y(nT_s) + k(1-\alpha)u(nT_s)$$

where T is a constant, k is a constant, $$\alpha = e^{-\frac{T_s}{T}},$$

$T_s$ is a discrete sample time, $y([n+1]T_s)$ is the turbo-equivalent output power value of the n +1 iternation, $y(nT_s)$ is the turbo-equivalent output power value of the n iteration, and $u(nT_s)$ is the current engine power of the n iteration.

35. The method of claim 34, wherein said dynamic response model is determined by the controller using infinite impulse response filtering.

36. The system of claim 35, wherein T and k are adaptively determined by the hybrid controller using infinite impulse response filtering.

37. The method of claim 33, wherein the hybrid controller is further configured to set the turbo-equivalent power limit to a zero boost power limit if the zero boost power limit is greater than said turbo-equivalent power limit.

38. The method of claim 33, wherein the hybrid controller is further configured to set the turbo-equivalent power limit to a torque curve power limit of the engine if the torque curve power limit is less than the turbo-equivalent power limit.

39. The method of claim 33, wherein said zero boost power limit is determined by monitoring the maximum available torque of the engine while the engine is idling.

40. The method of claim 39, wherein said zero boost power limit is determined by multiplying a current engine speed by the average of the maximum available torque of the engine when idling.

41. A method of operating a hybrid vehicle using a hybrid controller, comprising:
determining a zero boost power limit of a turbocharged engine, the zero boost power limit is determined when the engine is operating without substantial power contributed from the turbocharger;
determining a boosted torque curve power limit of the engine, said boosted torque curve power limit representing the maximum output power of the turbocharged engine when the turbocharger is substantially contributing to the output power of the engine;
determining a dynamic response model of the engine output power when the output power of the turbocharged engine is between said zero boost power limit and said torque curve power limit wherein the dynamic response model includes a model of engine output power with respect to rotations per minute of the crankshaft of the turbocharged engine; and
determining an engine-only torque curve of a turbocharged engine, including adjusting the output power of the engine and/or an eMachine when the engine and eMachine are used in conjunction, the adjusting performed to converge the output power with said dynamic response model.

42. The method of claim 41, further comprising:
monitoring a current output power of the engine when the engine is used in conjunction with the eMachine; and
compensating for a difference between said current output power and said dynamic response model by adjusting the output power of the eMachine.

* * * * *